Figure 1:
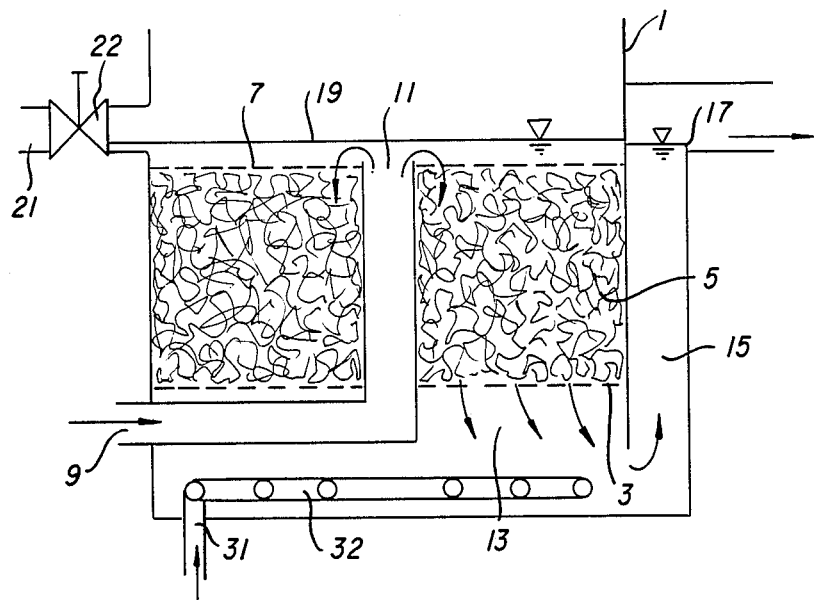

United States Patent [19]

Weiler et al.

[11] Patent Number: 4,842,745
[45] Date of Patent: Jun. 27, 1989

[54] PROCESS FOR SEPARATING ORGANIC COMPOUNDS FROM WATER BY EXTRACTION

[75] Inventors: Walter Weiler, Diez; Peter Belouschek, Essen, both of Fed. Rep. of Germany

[73] Assignee: Passavant-Werke AG & Co. KG, Fed. Rep. of Germany

[21] Appl. No.: 58,187

[22] Filed: Jun. 4, 1987

[30] Foreign Application Priority Data

Jun. 4, 1986 [DE] Fed. Rep. of Germany ....... 3618698

[51] Int. Cl.$^4$ .............................................. B01L 15/00
[52] U.S. Cl. ...................................... 210/679; 210/909
[58] Field of Search ............... 210/679, 680, 692, 691, 210/909

[56] References Cited

U.S. PATENT DOCUMENTS 4,276,179 6/1981 Soefhgen ............................. 210/679
4,470,909 9/1984 Bright ............................ 210/909 X

FOREIGN PATENT DOCUMENTS

A2169/82 7/1983 Austria .
0013659 4/1980 European Pat. Off. .
2901261 7/1980 Fed. Rep. of Germany .
0785219 12/1980 U.S.S.R. .................. 210/692

Primary Examiner—Frank Spear
Attorney, Agent, or Firm—Larson & Taylor

[57] ABSTRACT

Water, especially waste water, from which organic compounds such as, in particular, halogenated hydrocarbons are to be separated by extraction using a lipophilic extraction agent is passed through an open-cell carrier of large internal contact surface area in which the extraction agent is deposited on the contact surface and/or floods the carrier over at least part of its height to form a continuous liquid layer.

17 Claims, 2 Drawing Sheets

PROCESS FOR SEPARATING ORGANIC COMPOUNDS FROM WATER BY EXTRACTION

The invention relates to a process for separating organic compounds, especially halogenated hydrocarbons, from water by extraction as specified in the preamble to Claim 1.

A process of this type is described in German Offenlegungsschrift No. 2,901,261. In this process solid and liquid lipophilic materials are proposed for removing the organic compounds by extraction, adsorption and absorption, but no details are given of how in practical working of the process the water is to flow through the lipophilic substances. As examples, only laboratory trials are specified in which the lipophilic phase is formed in a sample vessel by a filling of paraffin shavings or by a partial filling of the vessel with paraffin oil.

European Patent Specification No. 0,013,659 and Austrian Auslegeschrift No. A 2169/82 describe the separation of halogenated hydrocarbons from water by liquid extraction, the extraction agent not being present as a fixed bed but being added in liquid form to the water to be purified or mixed with it in a counter-current mixer.

These known processes have considerable disadvantages. The paraffin in solid form described is very temperature-sensitive. It may be melted and washed away if hot waste water is to be treated without cooling, and it is left open as to how the extraction agent which has been washed away should then be separated. For a liquid extraction agent it is likewise unspecified as to how the exhausted extraction agent is to be separated from the purified water. Finally, the partition coefficient is so unfavorable for some organic compounds that the proposed elimination process requires exceptionally long contact times and unacceptably large quantities of the extraction agent. If these quantities and the treatment times are not observed then unsatisfactory degrees of extraction are obtained.

The object of the invention is to develop a process of the type referred to so as to achieve, with simple operation of the process, an especially effective interaction between the water to be purified and the extraction agent, and thus an especially high extraction efficiency.

In accordance with the invention two solutions are specified in Claims 1 and 2. The solutions are based on the same principle, namely to force the water through a carrier of large internal surface area into a flow path which is divided into many fine flow channels and in these flow channels to bring it into intimate contact with the extraction agent, which either is deposited on the surface of the carrier and/or completely occupies the pores or interstices of the carrier as a continuous liquid layer. In this situation the carrier has a three-fold function. Firstly, it disperses to a high degree the water to be purified so that the long contact times required materialize and the unfavorable partition coefficient is eliminated. Secondly, it makes the extraction agent available over the large contact surface area required. And thirdly, the foremost part of the carrier in the direction of flow acts as an adsorption and/or coalescing filter for the entrained droplets so that the purified water drawn off is largely free from extraction agent residues.

Further advantageous embodiments of the process in accordance with the invention are specified in the subclaims. In particular a combination of the two solutions mentioned above can be applied to advantage by using both a carrier with extraction agent deposited on it and a continuous layer of extraction agent which floods a part of the carrier.

A special process must be used if the organic compounds are present in the gaseous state, for example from equipment for chemical cleaning. These cleaning agent gases and vapours are normally subjected to a gas scrubbing process; however it is very difficult to eliminate these compounds, mostly halogenated organic compounds, from the waste water. The work is therefore generally carried out in closed circulation. One solution to the problem is presented by the extraction process under discussion, in which the gaseous compounds are dissolved in water by stripping and the water undergoes extraction in the carrier. It is also possible to undertake the stripping process simultaneously with the extraction, that is to introduce the water into the carrier at the same time as the gas. A particularly advantageous process procedure is however obtained by passing the gases directly through the carrier which is flooded only with extraction agent, thereby eliminating them.

The process in accordance with the invention is explained below with the aid of some embodiments by reference to the drawings in which:

FIG. 1 shows a schematic representation of a plant for carrying out the process in accordance with the invention, and FIGS. 2-9 show schematic vertical sections through a part zone of the extraction tank of FIG. 1 for various modifications of the process.

1 in FIG. 1 designates a taken or vessel which carries on a perforated supporting plate 3 a packing 5 of a material which forms a porous or latticed carrier with a great many interstices and flow channels. Materials which are suitable for this purpose are explained in greater detail below. The carrier can be covered on top by another perforated plate 7, especially if the former consists of a loose-packed bed of porous granules or the like. The water to be purified is supplied through the line 9 and passes via a riser pipe 11 to the top of the carrier 5 and flows through this from top to bottom. The purified water is drawn off from the space 13 below the plate 3 via a riser pipe 15 and an overflow edge 17. The height of the overflow edge 17 and the flow resistance of the carrier 5 determine the height to which the liquid level 19 settles in the tank 1.

The carrier 5 can be coated or charged with extraction agent in differing ways which are explained below. When the water to be purified flows through the large number of fine flow channels in the carrier 5 the organic compounds to be separated out, in particular halogenated hydrocarbons, make intimate contact with the extraction agent and are separated from the water.

If, after some time, the extraction agent is exhausted, that is it is extensively saturated with the separated organic compounds and thus has become ineffective, the extraction agent can be separated from the carrier by a back-flushing process and drawn off via the line 21 with shut-off device 22. The separation of the organic compounds can be carried out in a manner known per se by steam distillation. The regenerated extraction agent can be transferred back to the extraction tank 1 by a pump so that it can be re-deposited on the carrier. For the back-flushing procedure scavenging liquid and/or scavenging air or else the extraction agent itself can be supplied via one or several lines 31 and a distribution system 32 below the carrier 5.

Suitable materials for the carrier 5 are either a loose-packed bed of a granular or particulate material, such as, for example, Raschig rings or the like made of glass or plastic, particles made of foamed perlite or expanded clay and the like, or else a single- or multi-part packing of a material in the form of a space-lattice, in particular a cross-linked, foamed plastic such as polyurethane. A packing of mineral fibres in the form of a random non-woven material is also possible.

It is especially advantageous if the material forming the carrier consists of a material, or is coated with such a material, which has a coalescing and/or adsorbing action towards the extraction agent used. The part of the carrier which is not covered or flooded then has the property of a filter for the extraction agent used and can retain the particles or droplets of the extraction agent which may be entrained by the water to be purified. If the material forming the carrier does not itself have the required surface properties it can be coated with an appropriate material, in particular with a suitable synthetic resin, but also with activated carbon, metal or the like. Suitable coating processes are vacuum vapour-deposition, electrolysis, sinter-bonding or the like.

The extraction agent used for the extraction is not a permanent component of the carrier 5 but is brought temporarily into association with it. The extraction agent itself is generally a lipophilic liquid phase, for which, especially for waste water purification, only those extraction agents are suitable which can be separated from the water by gravity separation with at least a degree of separation which satisfies the regulations for direct and indirect discharge of waste waters. An aromatic-free liquid paraffin fraction, such as is known from the state of the art, is also preferably suitable as an extraction agent for the process in accordance with the invention. However, other extraction agents such as oils and waxes are also suitable, and it is even possible, for example, to use certain used oils as extraction agents in a particularly cost-effective manner.

In an initial embodiment of the process in accordance with the invention the entire internal surface area of the carrier 5 is provided with a coating of the liquid extraction agent which adheres by adhesive force. This is carried out, when the extraction vessel 1 is empty, by passing the liquid extraction agent through the vessel and the carrier 5 unit a sufficient quantity of the extraction agent has been deposited on the carrier 5. The excess liquid extraction agent is drawn off, and it is then possible to start feeding the water to be purified via line 9 and to start the extraction operation. This mode of operation of the process in accordance with the invention produces the vertical section in the vessel 1 shown schematically in FIG. 2 in which there are layers of water W, which are free from extraction agent, above and below the layer S+E occupied by the carrier 5. If particles or droplets of extraction agent are dragged downwards from the packing by the water flow they can separate from the water in the water-filled, low-flow space below the carrier 5 and rise upwards again where they re-deposit on the carrier 5.

Figures 2, 3, 4:
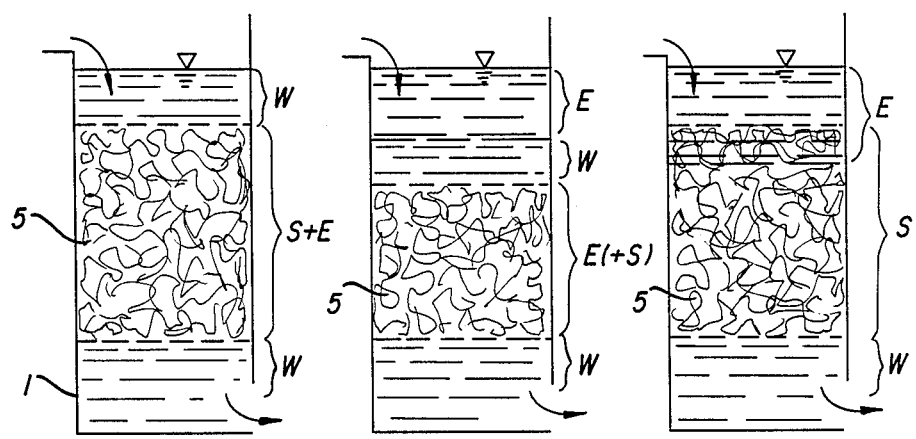

Another embodiment of the process in accordance with the invention is illustrated by FIG. 3. In this case there is at all times a floating layer of extraction agent E above the carrier 5, and the water is supplied by means of the riser pipe 11 in FIG. 1 in such a way that it discharges above or within the layer of extraction agent E and must therefore flow through the layer of extraction agent E. In this way intimate contact with the extraction agent and extraction of the organic compounds to be separated take place even in the layer of extraction agent E. The water then flows from the layer of extraction agent E, after traversing an intermediate layer W, into the carrier 5, which can either be free from extraction agent at the start of else, as in the embodiment shown in FIG. 2, can be coated on its internal surfaces with extraction agent. A further extraction takes place here of any organic compounds still present, and in addition any droplets of extraction agent which have been entrained from the layer E are retained in the carrier 5. The purified water is drawn off below the carrier 5. When the extraction agent in the carrier 5 has accumulated to form larger droplets and detaches itself these droplets then float up and join the floating layer of extraction agent E.

An especially preferred embodiment is illustrated by FIG. 4. In this case there is at all times above the carrier 5 a floating layer of extraction agent E of such thickness that it projects from above into the carrier 5 so that the upper zone of the carrier 5 is permanently flooded by the extraction agent E. When flowing into the carrier 5 the water conveyed into the layer of extraction agent E from above is forced into a flow which is distributed into many finely divided flow channels, the upper zone of each of these flow channels being filled with extraction agent E. It has been found that this achieves a particularly effective and intensive interaction between the water and the extraction agent. The remaining part of the carrier 5 below the layer of extraction agent E can either be provided with a layer of extraction agent on its surfaces, as in the example in FIG. 2, so that the water meets with a further extraction section below the layer E, or the carrier 5 below the layer of extraction agent E can be free from extraction agent so that it acts only as a filter for catching and retaining droplets of extraction agent which have been entrained from the layer E.

Figures 5, 6, 7:
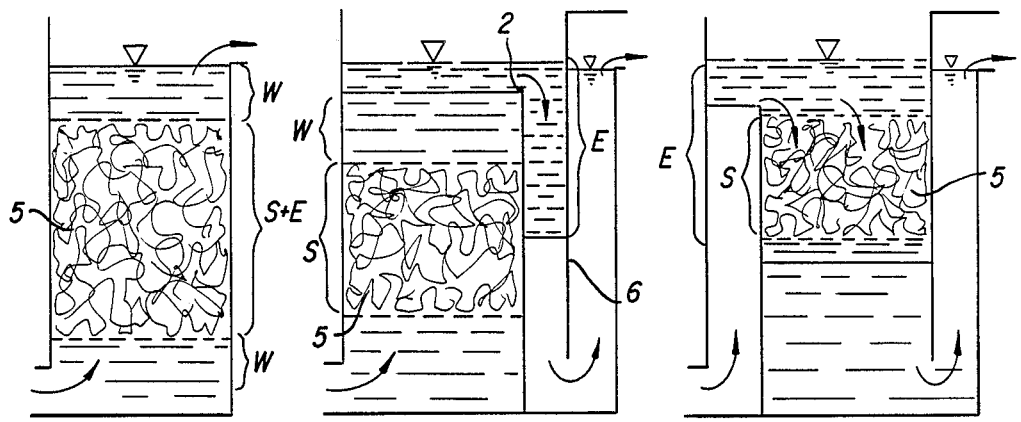

In the exemplary embodiments illustrated with the aid of FIGS. 1-4 the flow passes through the carrier with advantage from top to bottom. However, the reverse arrangement with water flow from bottom to top is also possible. FIG. 5 illustrates schematically the arrangement analogous to FIG. 2 in which the flow passes from bottom to top through the carrier 5, which is impregnated or charged with extraction agent, so that the purified water can be drawn off above the carrier 5. In the arrangement shown in FIG. 1 this requires a corresponding interchange of the feed and discharge which can be accomplished in a simple manner by those skilled in the art. If any entrained drops of extraction agent are to be held back, the off-take must take place lower down behind a downflow baffle which holds back the floating layer.

In the embodiment shown in FIG. 6 the water to be purified also first flows from bottom to top through a charged carrier 5, and then on the far side of the overflow edge 2 meets a compact, floating layer of extraction agent E, through which it must flow from top to bottom before it can be drawn off behind the downflow baffle 6.

The embodiment illustrated in FIG. 7 operates with a compact, floating layer of extraction agent E of thickness greater than the height of the carrier 5 so that it projects above and below the carrier 5 and the water flowing from above flows first into the layer of extraction agent E and then into the carrier 5 which is flooded by the said layer.

Figures 8, 9:
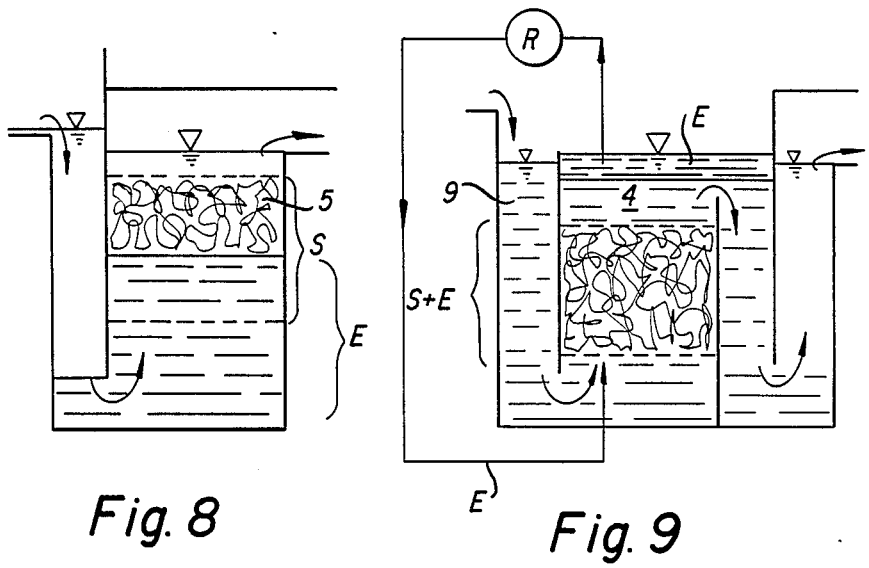

As a rule a liquid extraction agent is used which is less dense than water and floats on the water. In certain cases, however, it can be advantageous to use an extraction agent which is denser than water. A corresponding alternative embodiment is illustrated in FIG. 8. In this case there is a layer of extraction agent E at the base of the vessel of height such that it projects from below partially into the carrier 5 and floods the lower zone thereof. Above the carrier 5 there is water. The water to be purified which is fed from below flows first through the layer of extraction agent E and then through the carrier 5. The embodiment shown in FIG. 8 thus represents the inverse of the embodiment shown in FIG. 4. By using a dense extraction agent it is obviously also possible to operate with the inverses of the embodiments shown in FIGS. 3, 6 or 7.

The embodiment shown in FIG. 9 operates with a carrier 5 which is being constantly freshly coated. Below the carrier 5 extraction agent E is admixed to the waste water flowing in at 9. The mixture rises from below into the carrier 5 and coats it with extraction agent. Extraction agent which has peeled off and is possibly exhausted rises and collects in the floating layer E, while the purified water is drawn off at the side below the floating layer. Extraction agent can be withdrawn continuously from the floating layer E to the regeneration system R and returned in closed circulation.

It is also possible to operate the process in accordance with the invention in such a way that there is alternation between two of the different operating states described. For example, starting from the embodiment shown in FIG. 3, it is possible by temporarily lowering the water level to displace the layer of extraction agent E into the upper zone of the fixed bed F, and thereby produce the operating state shown in FIG. 4 in order to achieve, for example, periodic renewal of the covering of the upper part of the carrier 5 with extraction agent.

Finally, there is also a possible situation in which the density of the extraction agent is only slightly less than 1 and the density of the compounds to be extracted is considerably higher than 1. The density of the spent extraction agent can then increase to above 1, so that a floating layer which was previously present sinks to the base and the flow sequence is then reversed. The equipment used for liquid guidance and retention shown in FIGS. 6 and 7 makes allowance for this change.

In order to regenerate the compact liquid layer of extraction agent E in the embodiments shown in FIGS. 3, 4, 6, 7 and 8, this need only be drawn off and treated in a suitable manner in an extraction vessel. On the other hand the extraction agent deposited on the internal surface of the carrier 5 must be removed by a back-flushing procedure which is carried out by introducing a back-flushing medium such as water and/or air through the line 31 and the distributor 32 in FIG. 1. Hot water is used for preference to which washing-active substance or organic solvents can be added. A supply of superheated steam is also possible. Regenerated extraction medium can also be supplied at the same time as the air backflush medium so that the carrier is recoated immediately.

In another method for renewing the extraction agent, in addition to the air bubbled in from below water is added from above and at the same time an amount of water is drawn off underneath which exceeds the water feed. This backflushes the carrier from top to bottom in layers. The backflush sludge consisting of exhausted extraction agent and water is subjected to a separation procedure in a separate container, and the decanted water is transferred to the extraction stage again.

In special cases several stages can be connected in series through which the flow passes sequentially. In this case the pore size of the carriers can decrease in the direction of flow. Differing extraction agents can be used in the stages in order to be able to adapt the extraction process to the compounds to be removed. It is an advantage to regenerate the carriers at different times.

If the halogenated organic compounds involved are readily volatile then the whole system must be enclosed in a gas-tight enclosure. The gases or vapours are intercepted and subjected to a stripping process as previously described.

What we claim is:

1. In a process for separating halogenated hydrocarbons from water by extraction using a lipophilic extraction agent which is immiscible with water, the extraction being carried out by allowing the water to flow through the extraction agent, the improvement comprising carrying out the extraction process by allowing the water to flow through a porous carrier having substantially no propensity to extract halogenated hydrocarbons from water and including a large internal contact surface area upon which the extraction agent is deposited.

2. Process for separating halogenated hydrocarbons from water by extraction using a lipophilic extraction agent which is immiscible with water, the water being brought into contact with the extraction agent by allowing the water to flow through the extraction agent, characterized in that a porous carrier having substantially no propensity to extract halogenated hydrocarbons from water and including a large internal contact surface area and that this carrier is flooded over at least a part of its height with a continuous layer of the liquid extraction agent.

3. Process according to claim 1, characterized in that the carrier consists of a loose-packed bed of a granular material or of tower packing material.

4. Process according to claim 1, characterized in that the carrier consists of an open-cell foamed material.

5. Process according to claim 1, characterized in that the extraction agent is deposited on the internal surface of the carrier by intermittently flooding the carrier with the liquid extraction agent and drawing off the excess extraction agent.

6. Process according to claim 1, characterized in that after flowing through the continuous layer of extraction agent and/or the carrier the water flows through a space free from extraction agent in which entrained particles of extraction agent can separate from the water by gravity and can re-deposit on the layer of extraction agent and/or the carrier.

7. Process according to claim 1, characterized in that a continuous layer of extraction agent is positioned upstream, in the flow direction of the water, from the carrier which is charged with extraction agent, so that the water to be purified flows first into the layer of extraction agent and then into the carrier.

8. Process according to claim 1, characterized in that the carrier consists of a material, or is coated with such material, with surface properties such that it has an adsorbing and/or coalescing action towards the extraction agent.

9. Process according to claim 1, characterized in that a soluble, sorption-promoting agent, in particular a longer-chain alcohol or a non-ionic surfactant, is introduced into the water before it is admitted to the carrier.

10. Process according to claim 1, characterized in that the exhausted extraction agent is removed from the carrier by back-flushing and is regenerated.

11. Process according to claim 10, characterized in that in the case of a carrier through which the flow passes from top to bottom the extraction agent is removed first by bubbling in air underneath at a constant water level and then, with continued supply of air, by lowering the water level to below the carrier.

12. Process according to claim 10, characterized in that the spent extraction agent is removed from the carrier by cyclic lowering and raising of the water level.

13. Process according to claim 1, characterized in that the exhausted extraction agent is continuously renewed by passing it through the carrier in co-current flow with the waste water to be purified and drawing it off at the top.

14. Process according to claim 10, with a continuous layer of extraction agent which is positioned separately from the carrier, characterized in that the layer of extraction agent is drawn off before the carrier is back-flushed.

15. Process according to claim 1, in which the organic compounds occur in the gaseous state, characterized in that the gaseous compounds are dissolved in water by stripping and the water is then subjected to extraction in the carrier.

16. Process according to claim 1, in which the organic compounds occur in the gaseous state, characterized in that the gases are passed through the carrier together with the water used for stripping them.

17. Process according to claim 1, in which the organic compounds occur in the gaseous state, characterized in that the gases are passed through the carrier which is filled only with extraction agent.

* * * * *